United States Patent
Chong et al.

(10) Patent No.: US 6,501,731 B1
(45) Date of Patent: Dec. 31, 2002

(54) CBR/VBR TRAFFIC SCHEDULER

(75) Inventors: Simon Chong, Fremont, CA (US); Ryszard Bleszynski, Cupertino, CA (US); David A. Stelliga, Pleasanton, CA (US); Anguo Tony Huang, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/344,820

(22) Filed: Jun. 25, 1999

Related U.S. Application Data
(60) Provisional application No. 60/090,939, filed on Jun. 27, 1998.

(51) Int. Cl.[7] ............................................. H04L 12/56
(52) U.S. Cl. .................................. 370/230.1; 370/395.1
(58) Field of Search ................................ 370/230, 253, 370/234, 235, 395.1, 230.1, 229

(56) References Cited

U.S. PATENT DOCUMENTS

| | | | |
|---|---|---|---|
| 5,295,135 A | 3/1994 | Kammerl | 370/17 |
| 5,535,201 A | 7/1996 | Zheng | 370/60.1 |
| 5,539,729 A | 7/1996 | Bodnar | 370/18 |
| 5,638,371 A | 6/1997 | Raychaudhuri et al. | 370/347 |
| 5,640,399 A | 6/1997 | Rostoker et al. | 370/392 |
| 5,726,985 A | 3/1998 | Daniel et al. | 370/382 |
| 5,875,173 A | 2/1999 | Ohgane et al. | 370/230 |
| 6,011,775 A * | 1/2000 | Bonomi et al. | 370/230 |
| 6,011,798 A * | 1/2000 | McAlpine | 370/395 |
| 6,097,701 A * | 8/2000 | Grunenfelder et al. | 370/235 |
| 6,272,109 B1 * | 8/2001 | Pei et al. | 370/230 |

* cited by examiner

Primary Examiner—Chau Nguyen
Assistant Examiner—Scott Waite
(74) Attorney, Agent, or Firm—Blakley, Sokoloff, Taylor & Zafman LLP (57) ABSTRACT

A CBR/VBR traffic scheduler includes multiple CBR/VBR shapers to shape traffic over a wide range of peak cell rates for multiple CBR and VBR connection. Each shaper points to one or more VCs in a link list and includes a PCR counter initialized to a first value, an SCR counter initialized to a second and an arbitration counter. Each shaper is also connected to one of several clock sources, each having an associated clock cycle. A priority encoder, coupled to each arbitration counter, provides for determining priority between shapers having one or more associated VCs ready for transmission. Both the PCR counter and the SCR counter for each shaper is decremented during each associated clock cycle. For each shaper, when the PCR counter is decremented to a value of zero, the arbitration counter is initialized to a preset value and enabled for selection by the priority encoder. For each shaper, when the SCR counter is decremented to zero, a credit count parameter associated with each of the VCs in the associated link list is incremented by a predetermined value. The shaper having the lowest arbitration count value is selected by the priority encoder for cell transmission. When a shaper is selected for cell transmission, the associated link list of VCs is walked through in order. Only VCs that have a credit count parameter above a threshold value are transmitted.

8 Claims, 9 Drawing Sheets

| MBS CNT | SKIP CNT | ACTUAL PCR | CDV/Ideal WC CDV |
|---:|---:|---:|---:|
| | | % Scheduler PCR | (100 VCs) |
| 100 | 0 | 100.0 | 1.000 |
| 99 | 1 | 99.0 | 1.010 |
| 49 | 1 | 98.0 | 1.010 |
| 33 | 1 | 97.1 | 1.010 |
| 24 | 1 | 96.0 | 1.010 |
| 19 | 1 | 95.0 | 1.010 |
| 16 | 1 | 94.1 | 1.009 |
| 13 | 1 | 92.9 | 1.009 |
| 12 | 1 | 92.3 | 1.009 |
| 11 | 1 | 91.7 | 1.009 |
| 10 | 1 | 90.9 | 1.009 |
| 9 | 1 | 90.0 | 1.009 |
| 8 | 1 | 88.9 | 1.009 |
| 15 | 2 | 88.2 | 1.018 |
| 7 | 1 | 87.5 | 1.009 |
| 6 | 1 | 85.7 | 1.009 |
| 11 | 2 | 84.6 | 1.017 |
| 5 | 1 | 83.3 | 1.008 |
| 9 | 2 | 81.8 | 1.016 |
| 4 | 1 | 80.0 | 1.008 |
| 7 | 2 | 77.8 | 1.016 |
| 3 | 1 | 75.0 | 1.008 |
| 5 | 2 | 71.4 | 1.014 |
| 7 | 3 | 70.0 | 1.021 |
| 9 | 4 | 69.2 | 1.028 |
| 2 | 1 | 66.7 | 1.007 |
| 3 | 2 | 60.0 | 1.012 |
| 4 | 3 | 57.1 | 1.017 |
| 5 | 4 | 55.6 | 1.022 |
| 6 | 5 | 54.5 | 1.027 |

Fig. 8

Fig. 9

CBR/VBR TRAFFIC SCHEDULER

CROSS-REFERENCES TO RELATED APPLICATIONS

This application claims priority from U.S. Provisional Patent Application No. 60/090,939, entitled "NETWORK ACCELERATOR SUBSYSTEM BASED ON SINGLE-CHIP NETWORK PROCESSOR AND INTERFACE PROTOCOL," filed Jun. 27, 1998, the entire disclosure of which is herein incorporated by reference for all purposes. This application also claims priority from U.S. patent application Ser. No. 09/271,061, entitled "TWO-DIMENSIONAL QUEUING/DE-QUEUING METHODS AND SYSTEMS FOR IMPLEMENTING THE SAME," filed Mar. 16, 1999, the entire disclosure of which is herein incorporated by reference for all purposes.

The following patent applications, including this one, are being filed concurrently, and the disclosure of each other application is hereby incorporated by reference in its entirety into this application for all purposes:

Patent application Ser. No. 09/344,040 entitled "METHOD AND APPARATUS FOR CONTROLLING A NETWORK PROCESSOR";

Patent application Ser. No. 09/344,608 entitled "SYSTEM AND METHOD FOR PERFORMING CUT-THROUGH FORWARDING IN AN ATM NETWORK SUPPORTING LAN EMULATION";

Patent application Ser. No. 09/337,025 entitled "SYSTEM AND METHOD FOR CONTROLLING A NETWORK PROCESSOR";

Patent application Ser. No. 09/344,820 entitled "CBR/VBR TRAFFIC SCHEDULER";

Patent application Ser. No. 09/344,672 entitled "MULTI-PROTOCOL CONVERSION ASSISTANCE METHOD AND SYSTEM FOR A NETWORK ACCELERATOR";

Patent application Ser. No. 09/340,282 entitled "SYSTEMS AND METHODS FOR IMPLEMENTING POINTER MANAGEMENT";

Patent application Ser. No. 09/340,068 entitled "SYSTEM FOR MULTI-LAYER BROADBAND PROVISIONING IN COMPUTER NETWORKS"; and Patent application Ser. No. 09/344,453 entitled "NETWORK ACCELERATOR SUBSYSTEM BASED ON SINGLE-CHIP NETWORK PROCESSOR AND INTERFACE PROTOCOL".

Additionally, the disclosure of each of the following pending patent applications is hereby incorporated by reference in its entirety into this application for all purposes:

Patent application Ser. No. 09/335,223 entitled "SYSTEMS AND METHODS FOR IMPLEMENTING ABR WITH GUARANTEED MCR", filed Jun. 17, 1999; and Patent application Ser. No. 09/270,287, entitled "SYSTEMS AND METHODS FOR ON-CHIP STORAGE OF VIRTUAL CONNECTION DESCRIPTORS", filed Mar. 16, 1999.

BACKGROUND OF THE INVENTION

The present invention relates in general to traffic scheduling in networking systems, and more particularly to shaping Constant Bit Rate (CBR) and Variable Bit Rate (VBR) traffic in an Asynchronous Transfer Mode (ATM) networking system.

The need for faster communication among computers and other systems requires ever faster and more efficient networks. Today, networks typically use an amalgam of various software and hardware to implement a variety of network functions and standards. Network devices such as client computer systems, servers, hubs, routers, switches, network backbones, etc., are each complex devices that require digital processing in hardware and software to facilitate network communication. Some tasks performed in a network device include translation between different network standards such as Ethernet and ATM, reformatting data, traffic scheduling, routing data cells, packets messages, etc. Depending on the particular protocol being implemented, some tasks may be performed at different points in the network.

In conventional networking systems that implement ATM, data traffic is handled by a Virtual Channel, or Virtual Connection (VC). There are typically many VCs in each system and each VC has its own characteristics, such as packet type, packet size and protocols. For each VC, a descriptor which identifies the particular VC and its characteristics and requirements is stored in a memory. When a scheduler determines that a particular VC is ready for transmission, the VC descriptor is accessed and processed to determine the appropriate characteristics and requirements for cell transmission on the particular connection.

When scheduling transmissions and shaping traffic for many VCs, several service categories are typically available, including Constant Bit Rate (CBR), Variable Bit Rate (VBR) and Available Bit Rate (ABR), in order of typical priority. Because the ABR category typically has the lowest priority, one or more CBR or VBR VCs may be transmitted before an ABR VC that is scheduled for transmission.

Traffic shaping is a mechanism that alters the traffic characteristic of a stream of cells on a connection to achieve better network efficiency while meeting the quality of service (QOS) objectives, or to ensure conformance at a subsequent interface. Traffic shaping must maintain cell sequence integrity on a connection. Traffic shaping is often implemented in the network by usage parameter control (UPC) or network parameter control (NPC) functions, and/or virtual source, destination. Traffic shaping may also be used by the end system to ensure that the cells generated by the source at the user network interface (UNI) are in conformance with the negotiated traffic contract.

Each connection has a set of parameters specified in the connection traffic descriptor. The conformance algorithm and the parameters with the connection traffic descriptor define the conformance of a cell at an interface connection. The set of conformance definitions supported at the public UNI interface is network specific.

CBR connection conformance is typically characterized by a Peak Cell Rate (PCR) parameter and the corresponding Cell Delay Variation Tolerance (CDVT) for one or more traffic flows. For example, one PCR parameter could be for cell-loss priority (CLP)=0 or 1 flow and another could be for CLP=1 flow. One could define conformance to be the same for both CLP=0 and CLP=0 or 1 flows. In most cases, the same CDVT value is used for both PCR (CLP=0 and CLP=0 or 1) parameters. PCR is a mandatory traffic parameter in any CBR source traffic descriptor for CLP=0 or 1. On the other hand, CDVT is mandatory in any CBR connection traffic descriptor.

VBR traffic can be further classified as real time (RT) or non-real time (NRT). The conformance for both RT and NRT VBR connection is typically characterized by a Sustainable Cell Rate (SCR) parameter and corresponding CDVT for at least the CLP=0+1 flow. RT-VBR and NRT- VBR are typically distinguished by their QOS parameter, and also by the magnitude of the Maximum Burst Size (MBS) supported. A larger MBS is more typical for NRT-VBR connections. PCR for CLP=0+1 is a mandatory traffic parameter in any source traffic descriptor for a RT or NRT VBR connection. The CDVT is a mandatory parameter in any connection traffic descriptor for a RT or NRT VBR connection.

The PCR traffic parameter generally specifies an upper bound on the rate at which traffic can be submitted on an ATM connection. Enforcement of the PCR parameter by the UPC allows the network to allocate sufficient resources to ensure that the network performance objectives, for example the cell loss ratio, can be achieved. The PCR parameter for a given connection is typically negotiated during the signaling phase. The PCR parameter is coded in cells per second, and the granularity supported by the signaling message is typically 1 cell per second. An intuitive definition for PCR is the reciprocal of the minimum spacing of cells of an ATM connection on a transmission link.

The SCR parameter generally specifies an upper bound on the conforming average rate of an ATM connection. SCR is usually much smaller than PCR. SCR is enforced by a usage parameter control (UPC) agent to allow the network operator to allocate sufficient resources to ensure that the network performance objectives can be achieved. In a signaling message, SCR is given in unit of cells per second, and the granularity supported by the signaling message is typically 1 cell per second. The average rate is the number of cells transmitted divided by the duration of the connection.

The MBS parameter is generally determined from the burst tolerance, SCR and the generic cell rate algorithm (GCRA). MBS may be transmitted at PCR and still meet the conformance definition. In a signaling message, MBS is given in units of cells, and the granularity is typically 1 cell.

SUMMARY OF THE INVENTION

The present invention provides novel techniques for shaping CBR and VBR traffic. In particular, the techniques of the present invention provide enhanced traffic shaping and scheduling capabilities and increased data throughput.

According to the invention, a CBR/VBR traffic scheduler includes multiple CBR/VBR shapers to shape traffic over a wide range of peak cell rates for multiple CBR and VBR connection. Each shaper points to one or more VCs in a link list and includes a PCR counter initialized to a first value, an SCR counter initialized to a second and an arbitration counter. Each shaper is also connected to one of several clock sources, each having an associated clock cycle. A priority encoder, coupled to each arbitration counter, provides for determining priority between shapers having one or more associated VCs ready for transmission. Both the PCR counter and the SCR counter for each shaper is decremented during each associated clock cycle. For each shaper, when the PCR counter is decremented to a value of zero, the arbitration counter is initialized to a preset value and enabled for selection by the priority encoder. For each shaper, when the SCR counter is decremented to zero, a credit count parameter associated with each of the VCs in the associated link list is incremented by a predetermined value. The shaper having the lowest arbitration count value is selected by the priority encoder for cell transmission. When a shaper is selected for cell transmission, the associated link list of VCs is walked through in order. Only VCs that have a credit count parameter above a threshold value are transmitted.

According to an aspect of the invention, a network device, coupled to one or more networks, is provided for shaping cell transmission traffic for a plurality of variable bit rate (VBR) and constant bit rate (CBR) virtual channels (VCs). The device typically comprises a plurality of traffic shapers, wherein each shaper is connected to one of a plurality of clock sources, each clock source having a clock cycle, wherein each shaper is capable of shaping traffic for CBR and VBR VCs. Each shaper typically includes a pointer to a first VC in a link list of one or more VCs, a first counter initialized to a first starting value, wherein the first counter is decremented continuously on each clock cycle of the associated clock source, and an arbitration counter. The device also typically includes a priority encoder, coupled to each of the plurality of arbitration counters, for determining transmission priority between the plurality of shapers. In typical operation, for each shaper, when the first counter is decremented to a value of zero, the arbitration counter is initialized to a second starting value and enabled for selection by the priority encoder. Additionally, for each shaper, the arbitration counter is decremented after a cell transmission time associated with the shaper, and when one or more arbitration counters are enabled, the priority encoder selects for cell transmission the shaper that has the lowest value in its enabled arbitration counter.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DESCRIPTION OF THE SPECIFIC EMBODIMENTS

Figure 1:
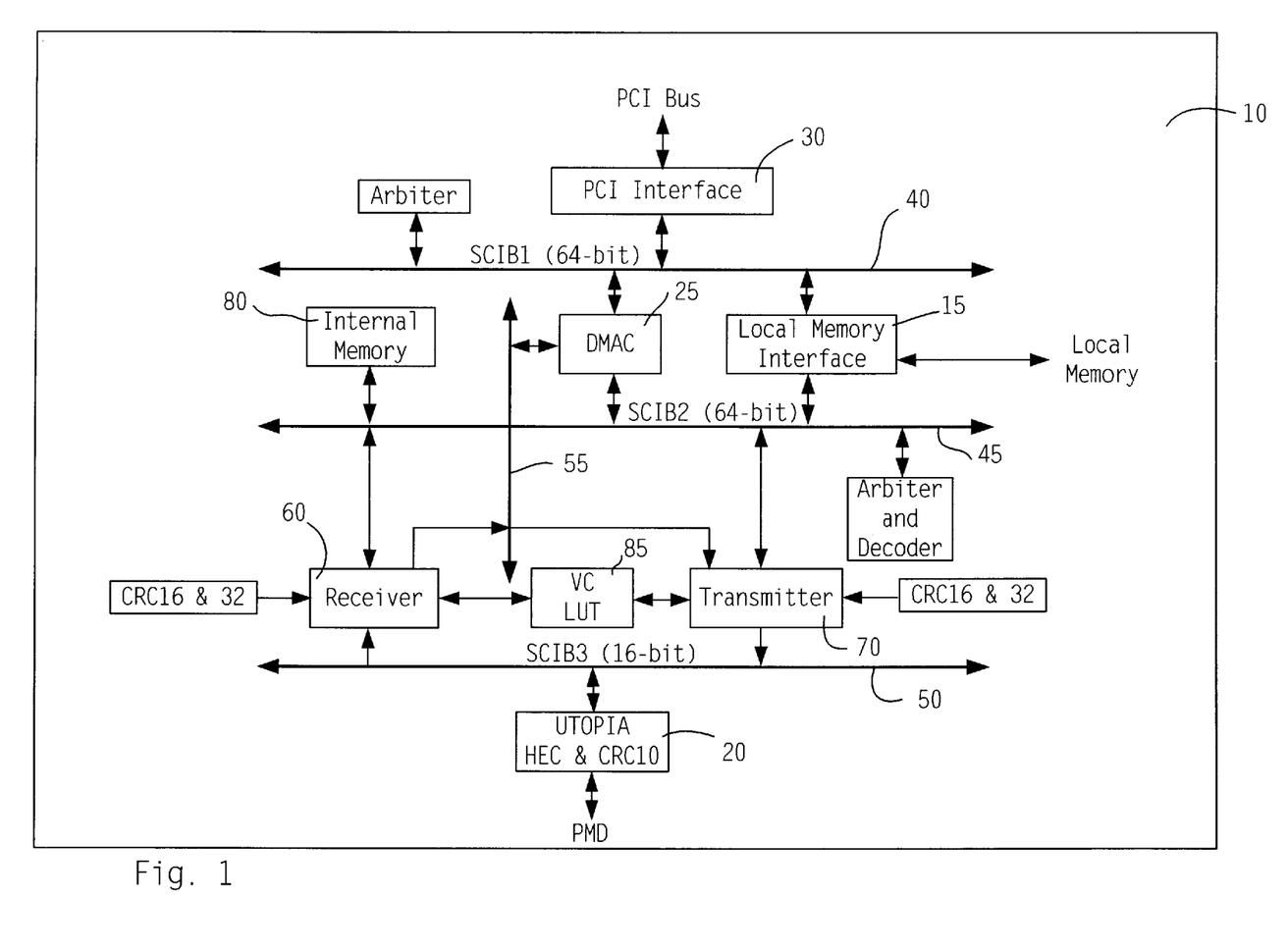
FIG. 1 is a block diagram of the architecture of a network processing engine according to the present invention.

FIG. 1 is a block diagram of the architecture of a network processing engine 10 according to the present invention. In preferred aspects, the network processing engine of the present invention is useful for a variety of network communications applications including implementation in multi-protocol network interface cards (NICs), server NICs, workgroup, IP and ATM switches, multi-protocol and IP routers, ATM backbone switch applications, multi-protocol and multi-protocol/ATM adapters and the like. In preferred aspects, all components of processing engine 10 reside on a single chip (e.g., a single silicon chip), but all components may be spread across many chips such that processing engine 10 is implemented using many chips.

Processing engine 10 includes a local memory interface block 15, UTOPIA interface 20, Direct Memory Access Controller (DMAC) 25, PCI interface 30, first internal bus 40, second internal bus 45, third internal bus 50, and cell bus 55. Processing engine 10 also includes an internal memory 80 and a receiver block 60 and a transmitter block 70 for processing incoming and outgoing data transmissions, respectively, over a communications interface, such as UTOPIA interface 20. Local memory interface block 15 provides a connection to a local, off-chip system memory, such as DRAM, SRAM, SDRAM, SSRAM or any combination thereof. DMAC 25 provides control of data transfers between external memories (PCI), internal memory 80 and the local memory. Internal memory 80 is used in one embodiment to store VC descriptors on-chip for fast access of the VC descriptors. Additionally, in one embodiment, internal memory 80 stores allowed cell rate (ACR) and minimum cell rate (MCR) bitmaps to provide enhanced ABR traffic scheduling capabilities.

PCI interface 30 provides a connection to external intelligence, such as a host computer system, and external packet memories. First and second internal buses 40 and 45 in one embodiment are non-multiplexed 32 bit address and 64 bit data buses. Depending on the desired line rate, PCI interface 30 is configured to run at frequencies up to 33 MHz over a 32 bit PCI bus, or at frequencies up to 66 MHz over a 64 bit PCI bus. For example, to achieve a 622 Mbps line rate, a 64 bit interface is used with frequencies up to 66 MHz. UTOPIA interface 20 supports connections to a broad range of layer 1 physical interfaces, including, for example, OC-1, OC-3, OC-12, OC-48, OC-192 and DS-3 interfaces and the like. To support a 622 Mbps line rate, the UTOPIA data bus is 16 bits, whereas for a 155 Mbps line rate the UTOPIA bus is 8 bits. Third internal data bus 50 is an 8 or 16 bit UTOPIA compatible interface. Cell bus 55 is a 64 bit data path and is used to transfer cells or frames between internal cell/frame buffers of receiver block 60 and transmitter block 70 and the PCI memory space through DMAC 25. Cell bus 55 allows several transactions to occur in parallel. For example, data payload transfers and descriptor data movement may occur simultaneously. Additionally, for a 622 Mbps line rate, cell bus 55 is capable of off-loading up to 160 MBps of bandwidth from local memory.

Figure 2:
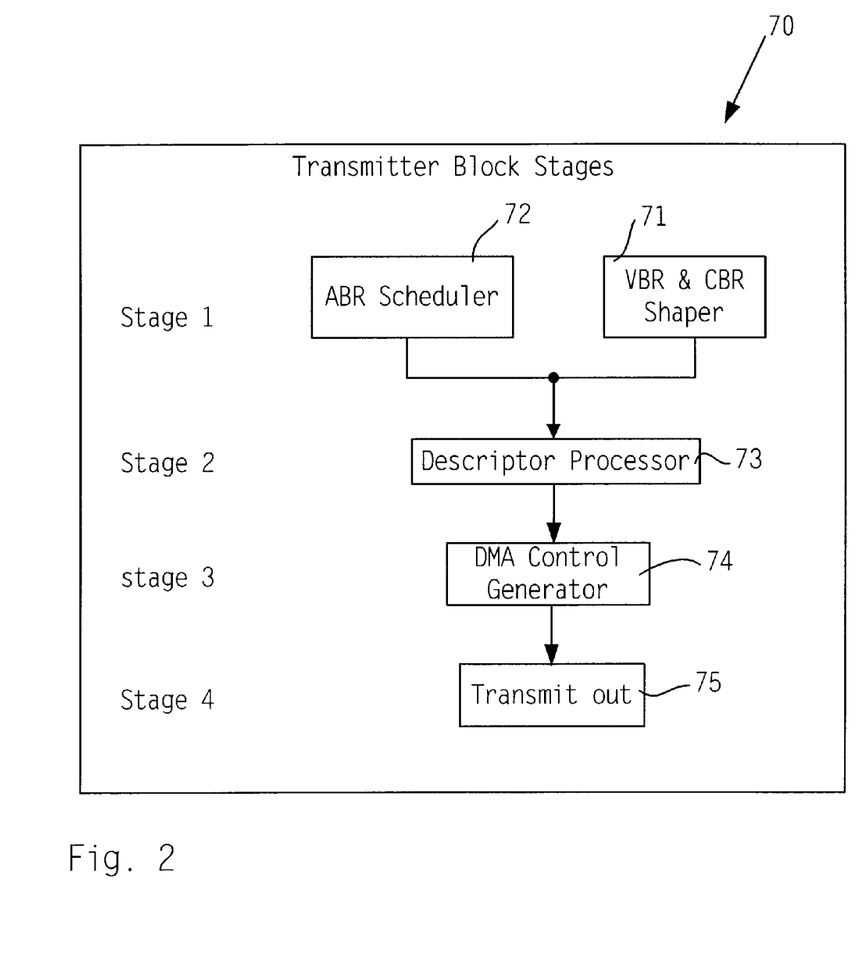
FIG. 2 shows the main components of a transmitter engine according to an embodiment of the present invention.

FIG. 2 shows the main components of transmitter engine 70 according to an embodiment of the present invention. As shown, transmitter engine 70 includes a VBR/CBR traffic shaper 71, an ABR scheduler 72, a VC descriptor processor 73, a DMA control generator 74 and a transmit out module 75. VBR/CBR shaper 71 (or multiple VBR/CBR shapers) and ABR scheduler 72 together comprise part of a timeslot scheduler. VBR/CBR shaper 71 provides a mechanism for shaping traffic for VBR and CBR VCs as will be described in more detail below. ABR scheduler 72 is an intelligent state machine that schedules ABR VCs for transmission. According to one embodiment, ABR scheduler 72 implements a timing wheel technique as disclosed in copending application Ser. No. 09/335,223, filed Jun. 17, 1999, entitled "Systems and Methods for Implementing ABR with Guaranteed MCR," the disclosure of which is hereby incorporated by reference in its entirety. The timing wheel mechanism disclosed therein provides for a guaranteed MCR and includes internally generated ACR and MCR bitmaps that provide for a fast search mechanism. When an ABR, VBR or CBR VC is ready to be serviced for transmission, the appropriate VC descriptor pointer is sent to VC descriptor processor 73, which fetches the VC descriptor from internal memory 80 or local memory. VC descriptor processor 73 then processes the VC descriptor and queues the necessary parameters within a transmit cell ready buffer for the DMA control generator 74 to initiate DMA transfer. DMA control generator 74 transfers the cell from the PCI or local memory space into a transmit cell buffer. Transmit out module 75 determines whether to transmit the cell from the transmit cell buffer or to transmit an idle cell instead. Transmit out module 75 is also responsible for stepping back the transmission rate depending on how much the network is congested.

For VBR VCs, VC descriptor processor 73 also determines whether the cell has credit to send before queuing the related parameters into the transmit cell ready buffer. In general, CBR VCs only use the PCR counter, whereas for VBR VCs, both the PCR counter and the SCR counter are used. Related parameters within the VC descriptor used for determining credit include an MBS counter parameter, an MBS credit counter parameter and the SCR parameter.

Figure 3:
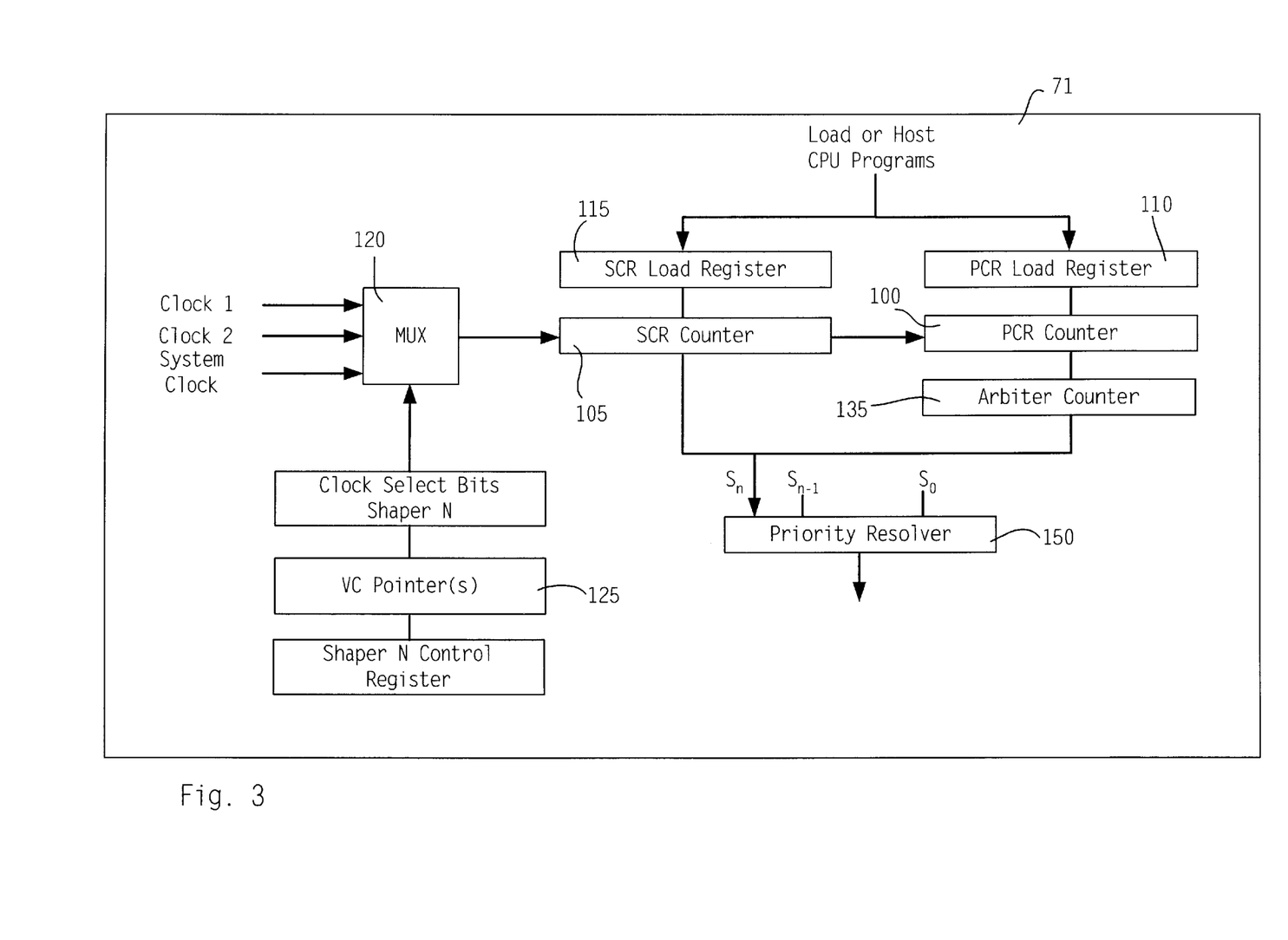
FIG. 3 illustrates the general architecture of a traffic shaper for shaping CBR and VBR traffic according to an embodiment of the present invention.

FIG. 3 illustrates the general architecture of traffic shaper 71 for shaping CBR and VBR traffic according to an embodiment of the present invention. As shown, shaper 71 includes two counters, PCR counter 100 and SCR counter 105, to keep track of timing related to the PCR parameter and the SCR parameter, respectively. PCR counter is coupled to PCR register 110, and SCR counter 115 is coupled to SCR register 115. SCR register 115 and PCR register 110 hold the initial count as programmed by the local or host processors. Shaper 71 also includes a multiplexer module 120 that allows shaper 71 to select from multiple clocks. For example, in one embodiment as shown, shaper 71 is able to select from two external clocks and a system clock. Arbiter Counter 135 is provided for determining priority among multiple shapers as will be described in more detail below.

In general, there are one or more VCs attached to shaper 71 via VC pointer 125. The VCs attached to shaper 71 are linked within internal memory 80, the local memory or a combination of the local memory and internal memory 80. VC pointer 125 points to the first transmit VC descriptor in a linked list of VCs within internal memory 80 or local memory. Within the transmit VC descriptor there is a forward and backward pointer for the linked list of VCs within shaper 71. The local microprocessor adds VCs to the link list. An example of a two-dimensional link list data structure that is useful for a plurality of VCs can be found in copending application Ser. No. 09/271,061, filed Mar. 16, 1999, entitled "Two-Dimensional Queuing/De-Queuing Methods And Systems For Implementing the Same," the disclosure of which is hereby incorporated by reference in its entirety.

Figure 4:
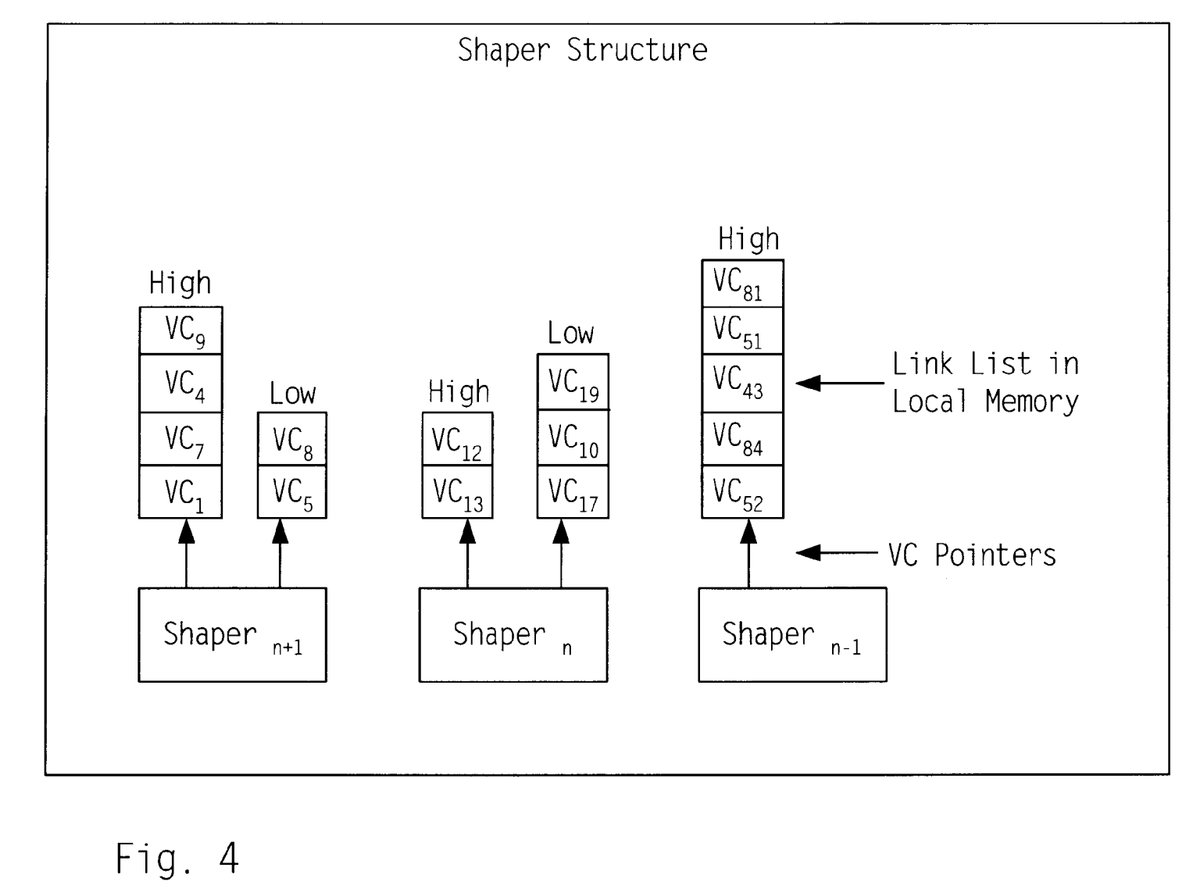
FIG. 4 illustrates the basic link list structure associated with multiple traffic shapers according to the present invention.

FIG. 4 illustrates an example of the basic link list structure associated with multiple traffic shapers according to the present invention. According to an embodiment of the present invention, as shown, each traffic shaper includes two VC pointers, one for a high priority VC list and the other for a low priority VC list. The two VC pointers are programmed by the local microprocessor within a VC pointer register. In an alternate, only one VC list is used.

In operation, when a shaper elapses, i.e., when either PCR counter 100 or SCR counter 105 elapses, one or more cells for the linked VCs are ready for transmission. Transmit engine 70 services the shaper when either the PCR or SCR counter has elapsed and the shaper has credit to transmit. While servicing the shaper, transmit engine 70 traverses through the link list of VCs that are ready for transmission. In the embodiment with high and low priority VC link lists, the high priority field within the shaper's VC pointer register is used to form the descriptor pointer to the first VC within the high priority link list. After all the VCs within the high priority link list are serviced, the VCs in the low priority link list are serviced.

Figure 5:
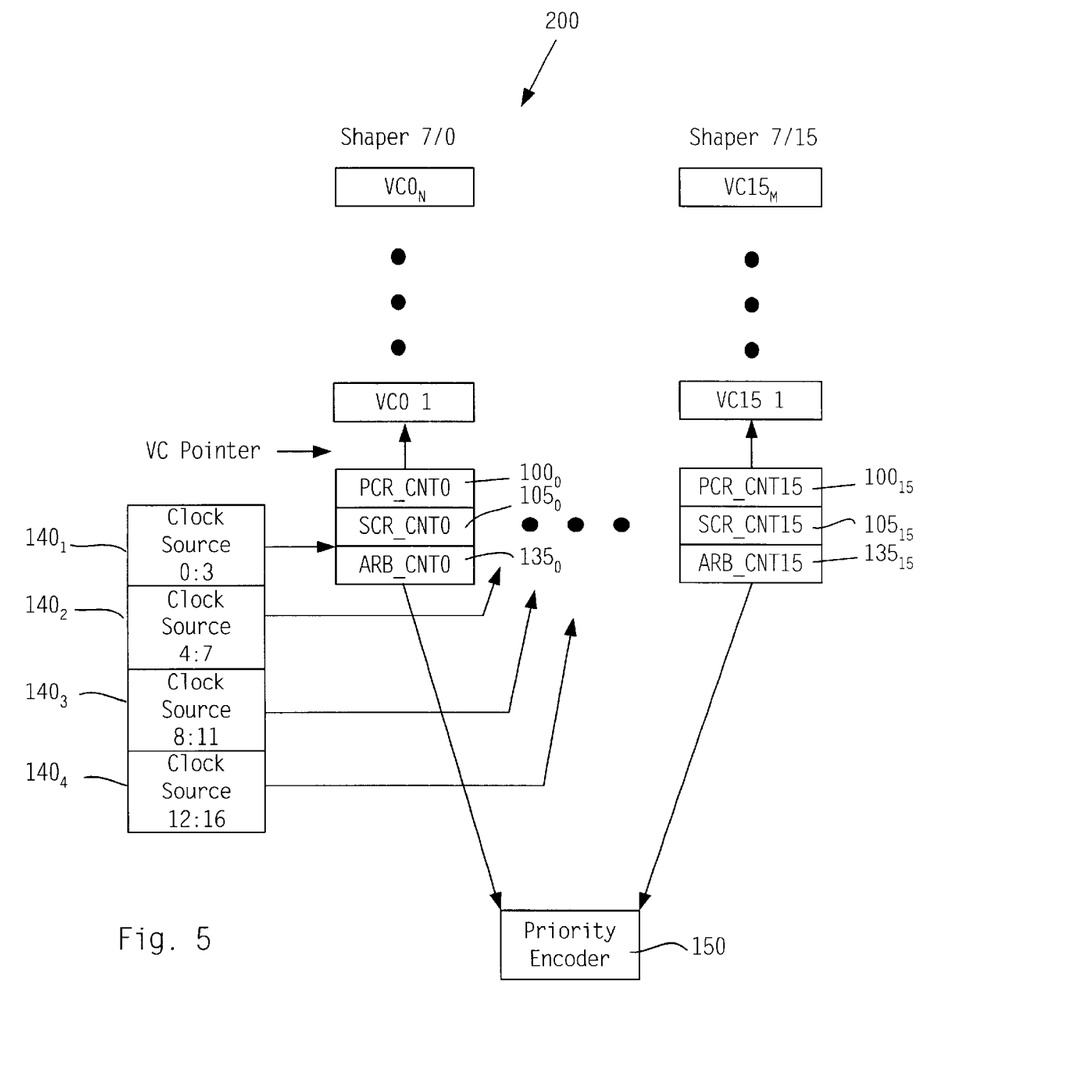
FIG. 5 illustrates the basic structure of a CBR/VBR scheduler including multiple CBR/VBR traffic shapers according to an embodiment of the present invention.

FIG. 5 illustrates the basic structure of a CBR/VBR scheduler 200 including multiple CBR/VBR traffic shapers, $71_0$ to $71_{15}$, according to an embodiment of the present invention. The following description refers to the exemplary embodiment including 16 shapers and 4 clock source blocks as shown in FIG. 5, although it will be apparent to one of skill in the art that fewer or more shapers and clock sources may be implemented as desired for the particular application. In a preferred embodiment, each of the clock source blocks $140_0$ to $140_4$ are able to select one of four clocks LM_CLK, LM_CLK/2, LM_CLK/4, and EXT_CLK. In this embodiment, each clock source 140 is preferably associated with a block of four of the sixteen shapers. Each shaper 71 is associated with a linked list of active VCs. Each VC has several parameters associated with the shapers, including MBS_CNT (Maximum Burst Size Counter), the maximum PCR burst size, SKIP_CNT (Skip Counter), the number of PCR intervals to skip between bursts, CREDIT_CNT, the credit expressed in number of cells and SCR_INCR (Sustained Cell Rate Increment). Each shaper itself has several parameters associated with it, including PCR_CNT (Peak Cell Rate Count), SCR_CNT (Sustained Cell Rate Count), and ABR_CNT (Arbitration Count).

The clock sources 140 for each of the shapers are programmed and the reload, or initialization, values of the PCR_CNT, the ABR_CNT and the SCR_CNT for each of the shapers are programmed. Additionally, the MBS_CNT, the SKIP_CNT and the SCR_INCR for each of the active VCs are programmed. In preferred aspects, the clock sources, reload values, and counter and increment values are all programmed by software. Software also preferably determines which clock source is associated with each bank of 4 shapers (0–3, 4–7, 8–11, 12–15).

Once the shapers are enabled, the PCR_CNT and the SCR_CNT are decremented continuously on each clock cycle of the associated clock source. Each time the PCR_CNT is decremented to zero, the PCR_CNT is initialized to its reload value, and the ARB_CNT is initialized to its reload value and is enabled for selection by the priority encoder. Each time the SCR_CNT is decremented to zero, the SCR_CNT is initialized to its reload value and state is maintained to indicate that this shaper's SCR count has elapsed. This state is reset after the transmission processing for the shaper has completed (which occurs the next time that PCR_CNT reaches zero). The priority encoder 150 examines all the enabled ARB_CNTs and selects the shaper with the lowest ARB_CNT value to be serviced for transmission. While a shaper is waiting to be selected, its ARB_CNT is decremented once per cell transmission. Once a shaper is selected for transmission, the selected shaper inspects in order each of the VCs on its link list and causes cells to be transmitted. Cells may or may not be transmitted depending on the credit (number of tokens) available for a particular VC that is ready for transmission.

The credit information is stored in the transmit VC descriptor and, therefore allows for shaping on a per-VC basis. In preferred aspects, a cell is transmitted according to the following rules:

If the shaper SCR count has elapsed, the CREDIT_CNT field is incremented by the SCR_INCR with the CREDIT_CNT saturating at 65535.

If the MBS_CNT is greater than zero and the CREDIT_CNT is greater than zero, a cell is transmitted and the CREDIT_CNT and the MBS_CNT are decremented.

If the MBS_CNT is decremented to zero, then SKIP_CNT is loaded and decremented as each skip occurs.

When the SKIP_CNT is equal to zero, then the MBS_CNT is reloaded and cells are sent again.

This burst and skip process repeats itself indefinitely.

Figure 6:
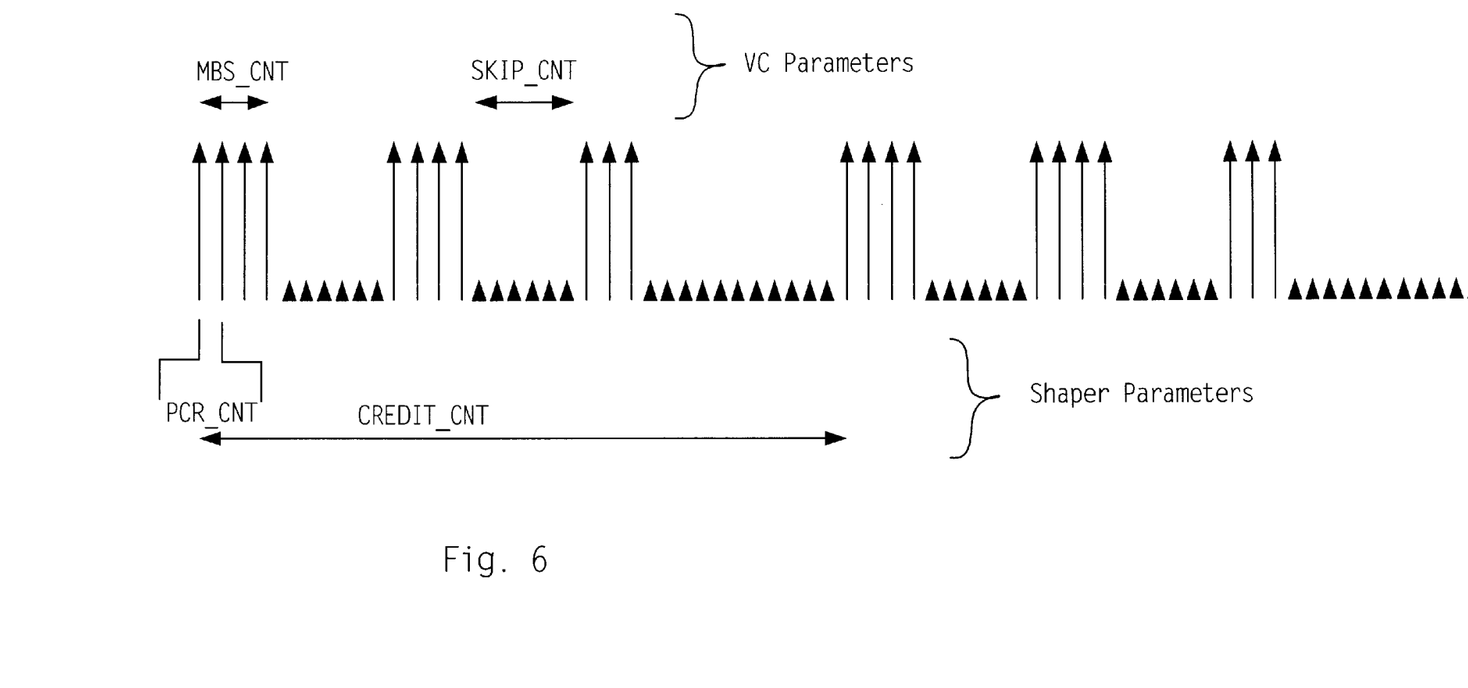
FIG. 6 displays the generic shape that can be generated by the scheduler shown in FIG. 5 as well as the parameters that are associated with each aspect of the shape.

FIG. 6 displays the generic shape that is generated by the scheduler shown in FIG. 5 as well as the parameters that are associated with aspects of the shape. As shown, the PCR_CNT determines the minimum spacing between cells, the MBS_CNT determines the number of cells bursted at PCR before encountering a skip period, the SKIP_CNT determines the number of PCR cell slots to skip before transmitting another burst, and the CREDIT_CNT combined with the SCR_CNT determines the number of cell slots to skip between groups of bursted cells. The instantaneous value of CREDIT_CNT is a generally a function of SCR_INCR which is added to it each time SCR_CNT reaches zero.

According to one embodiment, to accommodate a wide range of CBR connections, one shaper is assigned to each CBR connection. In this embodiment, to set up a shaper for a particular rate (cells/second) the shaper is preferably configured as follows:

$SCR\_CNT=0$, and $$PCR\_CNT = \text{Roundup}\left(\frac{SOURCE\ CLK\ FREQ}{PCR}\right) < = 2^{24} - 1.$$

Also, the VC descriptors for CELL_RATE CBR connections linked to this shaper are preferably configured as follows:

$MBS\_CNT\ !=0$, and $SKIP\_CNT=0$.

As an example, if a CBR connection has a PCR of 167 cells per second, and the clock source selected is LM_CLOCK=66 MHz, then $$PCR\_CNT = \frac{66 \times 10^6}{167} = 395210 = 0x607CA.$$

In preferred aspects, the clock source for a particular shaper is chosen to be the highest available frequency such that PCR_CNT as calculated above is represented in the available 24 bits. This ensures that the actual cell rate is as close as possible to the desired rate by minimizing rounding errors.

Figure 7:
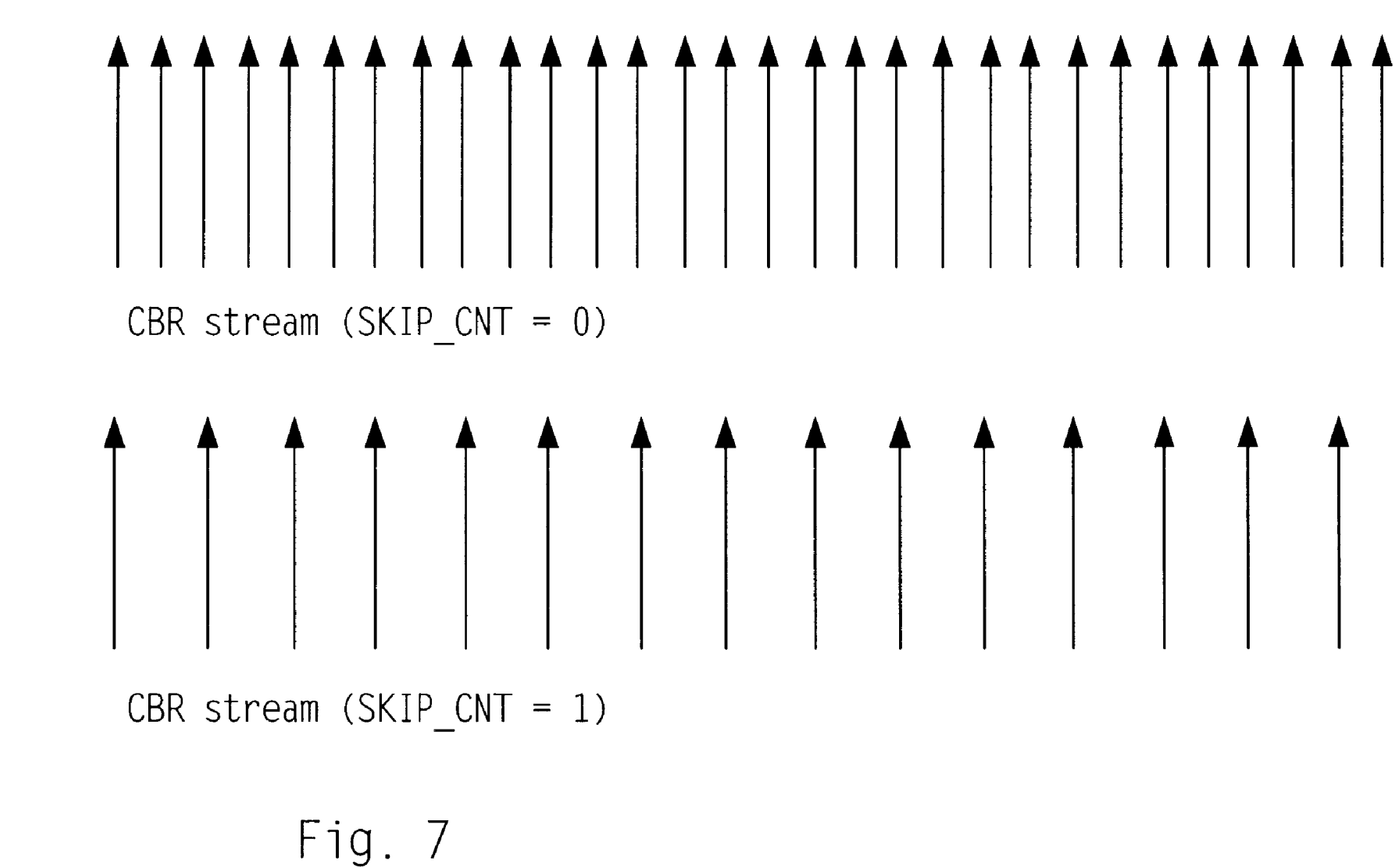
FIG. 7 shows examples of the CBR stream when the associated SKIP_CNT is equal to 0 and 1.

In this embodiment, 16 different CBR rates are supported using the 16 shapers as shown in FIG. 5. In addition, by setting SKIP_CNT !=0, CBR VCs with rates that are an integral divisor of the CELL_RATE can be configured. For instance, in the above case, a VC descriptor with SKIP_CNT=1 yields a rate of 83 cells/sec. FIG. 7 shows examples of the CBR stream when the associated SKIP_CNT is equal to 0 and 1.

According to an embodiment of the present invention, to avoid the insertion of idle cells into the cell stream, the lower rate connections are alternated with full rate connections when linked to the shaper's list of VC's. This strategy allows an arbitrary number of CBR rates to be supported.

Figure 8:
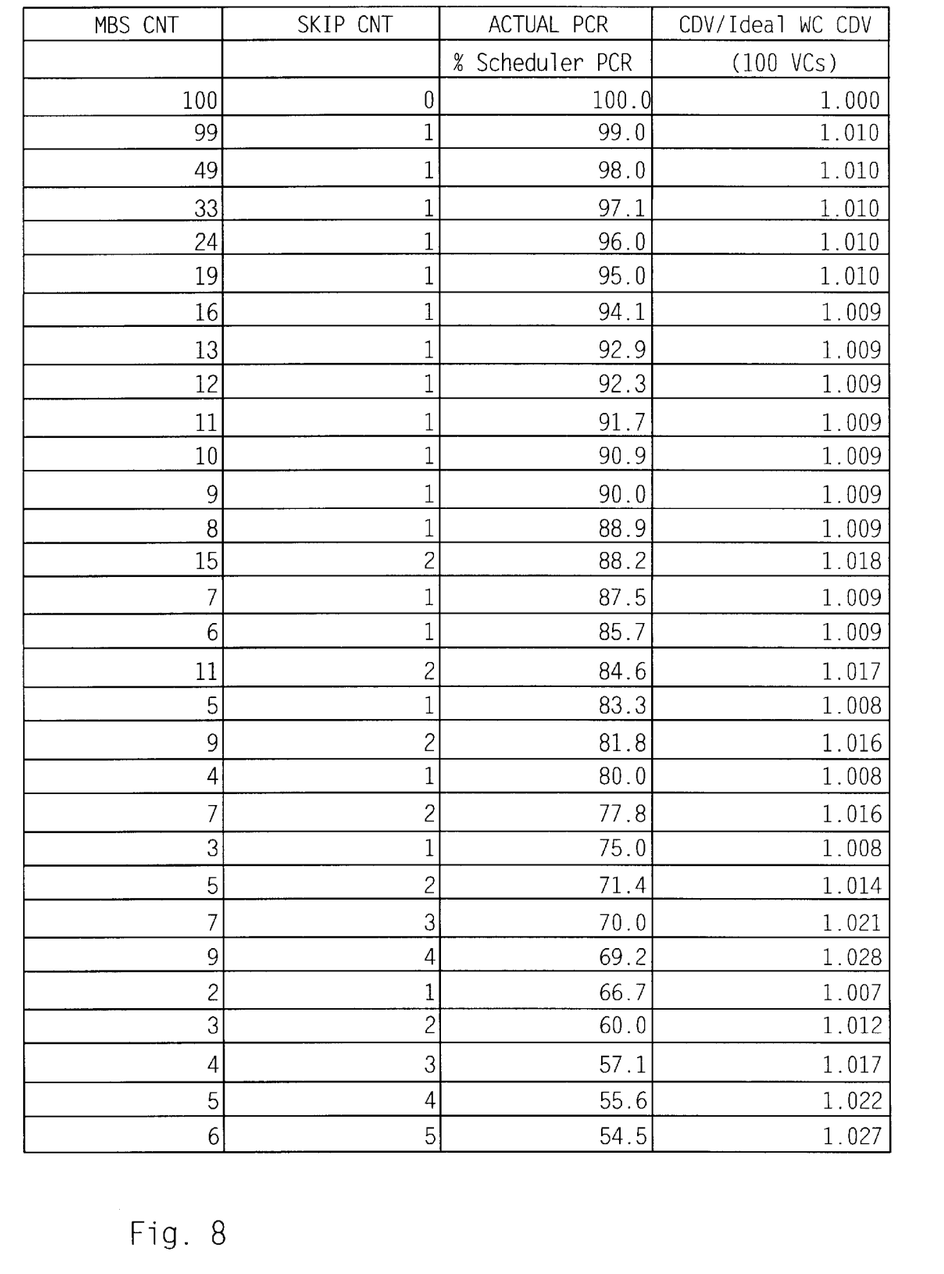
FIG. 8 shows a sampling of rates that are generated for various values of MBS_CNT and SKIP_CNT according to an embodiment of the present invention.

According to an alternate embodiment, to accommodate a wide range of CBR connections, a CBR stream is approximated with a sequence of cell bursts. As long as the inter-burst interval is small compared to the burst size then the cell delay variation (CDV) introduced is relatively small and the cell stream produced will still be a conforming one. Also, keeping SKIP_CNT/MBS_CNT less than one optimizes the shapers ability to find a cell for transmission within a cell time. With this constraint, a single shaper can be used to generate granular rates between PCR and PCR/2. A sampling of rates that can be generated for various values of MBS_CNT and SKIP_CNT is shown in FIG. 8. In one embodiment, shaper 0's PCR is programmed at line_rate, shaper 1's PCR is programmed at line_rate/2, and so on (for shaper15, the PCR is programmed at PCR/32K). By assigning these PCR rates to the scheduler, the range of rates that the shapers can support runs from line_rate all the way down to line_rate/64K. The ARB_CNT value of each shaper can be used to increase or decrease the average CDV experienced by a VC on a particular shaper.

In preferred aspects, to achieve the lowest CDV as a percentage of the nominal cell time for a CBR connection, ABR_CNT is set proportionally lower for shapers that have a lower programmed PCR_CNT. A lower ARB_CNT value produces a lower average CDV.

The worst case CDV generated from an ideal source is determined by the line_rate (in cells/second), and the number of VCs associated with the high priority traffic class. The cell delay variation is given by the following equation:

$$CDV = \frac{\text{number high priority } VCs - 1}{\text{line\_rate}}.$$

The explanation of this equation is relatively simple. All the high priority VCs could possibly be scheduled for a single time slot. In this case, one VC will have to wait for all the other VCs to be transmitted before it can be transmitted.

Figure 9:
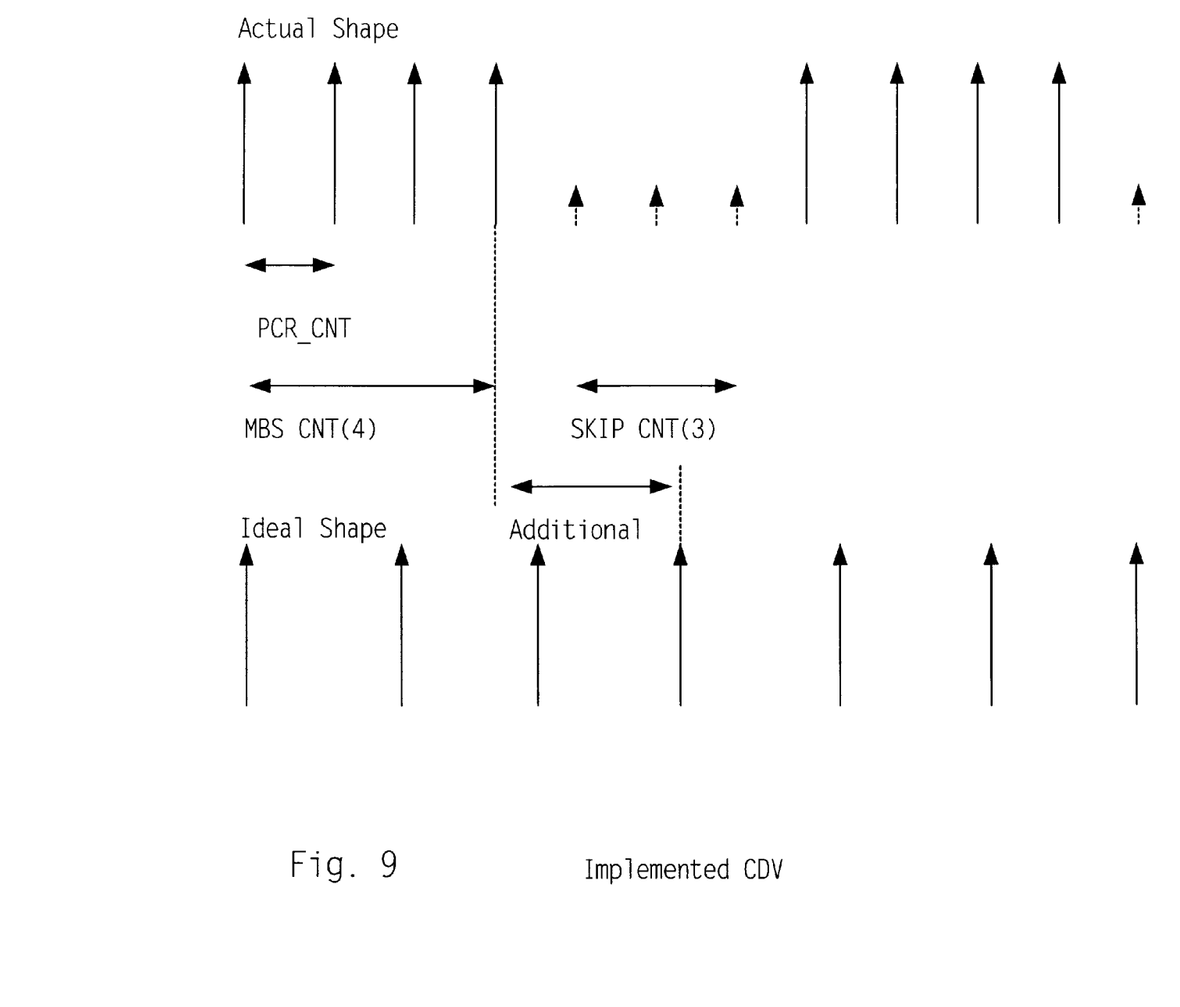
FIG. 9 shows an example of how the actual CBR shape differs from the ideal CBR shape.

Since the scheduler implements various rates by purposely skipping transmission opportunities, the worst case CDV implemented by the scheduler is directly related to the SKIP_CNT. In fact the CDV generated by the scheduler can be approximated as SKIP_CNT×ideal_worst_case_CDV reduced by the ratio of the PCR/scheduled_PCR. FIG. 9 shows an example of how the actual CBR shape differs from the ideal CBR shape.

The equations needed to calculate how the actual CDV differs from the ideal CDV are:

$$CR = \text{scheduled\_PCR} \times \frac{MBS\_CNT}{(MBS\_CNT + SKIP\_CNT)}, \text{ and}$$

$$\text{Actual\_CDV} = \text{ideal\_worst\_case\_CDV} + SKIP\_CNT \times \frac{PCR}{\text{scheduled\_PCR}}.$$

For VBR VC's, the SCR_CNT in the associated shaper must be configured. All VBR VC's linked to a particular shaper inherit the PCR as determined by the PCR_CNT. Thus, with 16 shapers, for example, at most 16 different PCRs can be supported for VBR connections. SCR_CNT is set at a value that is greater than or equal the PCR_CNT for any given shaper. Setting SCR_CNT less than PCR_CNT is equivalent to setting SCR_CNT=PCR_CNT.

In one embodiment, the calculation of the values for shaper and VC parameters needed in order to achieve a connection of a given PCR, MBS and SCR is substantially simplified if SCR_CNT is an integral multiple of PCR_CNT. Given this constraint, for a given PCR, MBS, and SCR, in order to generate a cell stream of conforming maximum-sized bursts at the peak rate, the shaper and VC parameters are preferably configured such that:

$$PCR\_CNT = \text{RoundUp}\left(\frac{SOURCE\_CLK\_FREQ}{PCR}\right) <= 2^{24} - 1,$$

$$SCR\_CNT = N \times PCR\_CNT <= 2^{24} - 1,$$

$$MBS\_CNT = MBS <= 2^8 - 1,$$

$$SCR\_INCR = \text{RoundDown}\left(N \times PCR\_CNT \times \frac{SCR}{SOURCE\_CLK\_FREQ}\right) <= 2^{10} - 1,$$

and $$SKIP\_CNT = \text{RoundUp}\left((MBS - 1) \times \left(\frac{1}{SCR} - \frac{1}{PCR}\right)\right) <= 2^8 - 1,$$

where the source clock is chosen to be the maximum such that PCR_CNT<^$2^{24}$-1, and N is a positive non-zero integer in the range $$\text{RoundUp}\left(MBS * \frac{PCR}{SCR}\right) <= N <= (2^{10} - 1) \times \frac{SOURCE\_CLK\_FREQ}{PCR\_CNT \times SCR}.$$

Here, MBS_CNT and SKIP_CNT are set to generate the required shaping with SCR_CNT and SCR_INCR set such that there is always enough credit.

As an example, to generate a shaped VBR stream of maximal size bursts at the peak rate that conforms to PCR=66780 cells per second, MBS=5 cells and SCR=167 cells per second, with a shaper source clock frequency of 66 MHz, the shaper and VC parameters are set to (choosing the maximal value for N):

PCR_CNT=9881,

SCR_CNT=16758057,

MBS_CNT=5,

SKIP_COUNT=156, and

SCR_INCR=42, which results in an actual conforming cell stream with PCR=66779.49, SCR=165.31 and MBS=5.

Because the scheduler is able to process 4 VC table entries per cell time if there are no cells found for transmission, VBR VC's are preferably interleaved with CBR VC's when linked to a shaper. Preferably, at most 3 VBR VC's should be linked between full rate CBR connections. If a cell is not found for transmission within the cell time, then an idle cell is inserted in the transmission stream. This may be acceptable, but results in an under-utilization of the full bandwidth available for transmission.

According to one embodiment, priority encoder 150, together with a dequeue processor (not shown) determines the order in which the shapers are serviced, and therefore the order in which VCs are transmitted, when many shapers are vying for transmission. An example of a traffic arbitration algorithm implemented by priority encoder 150 is as follows:

If any CBR only shaper has a VC to send then
    Pick CBR shaper with lowest ARB_CNT and send a VC from current pointer of list.
    If transmitted VC is the last VC on the link list then
        Reload the shaper's ARB_CNT;
    End If;
    Decrement the ARB_CNT of all other shapers that have VCs pending;
Else
    If a VBR shaper's ABR_CNT<TS_ARB_CNT then
        Pick VBR shaper with lowest ARB_CNT and send a VC from current pointer of list.
        If transmitted VC is the last VC on the link list then
            Reload the shaper's ARB_CNT;
        End If;
        Decrement the ARB_CNT of all other shapers that have VCs pending;
    Else—pick TS scheduler
    Send a cell from TS scheduler's next timeslot VC;
    Reload the TS_ARB_CNT;
    Decrement the ARB_CNT of all other shapers that have VCs pending;
    End If;
End If;

In the above algorithm, TS refers to the timeslot scheduler, and TS_ARB_CNT refers to the timeslot scheduler's separate arbiter count value as used by priority encoder 150 for non VBR/CBR transmissions.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A network device, coupled to one or more networks, for shaping cell transmission traffic for a plurality of variable bit rate (VBR) and constant bit rate (CBR) virtual channels (VCs), the device comprising:

a plurality of traffic shapers, wherein each shaper is connected to one of a plurality of clock sources, each clock source having a different clock cycle, wherein each shaper is capable of shaping traffic for CBR and VBR VCs, and wherein each shaper includes:
    a pointer to a first VC in a link list of one or more VCs;
    a first counter initialized to a first starting value, wherein the first counter is decremented continuously on each clock cycle of the associated clock source; and
    an arbitration counter; and
a priority encoder, coupled to each of the plurality of arbitration counters, for determining transmission priority between the plurality of shapers;
wherein, for each shaper, when the first counter is decremented to a value of zero, the arbitration counter is initialized to a second starting value and enabled for selection by the priority encoder, and wherein, for each shaper, the arbitration counter is decremented after a cell transmission time associated with the shaper; and
wherein when one or more arbitration counters are enabled, the priority encoder selects for cell transmission the shaper that has the lowest value in its enabled arbitration counter.

2. The device of claim 1, wherein the entire link list of VCs associated with the shaper selected for cell transmission is walked through before another shaper is selected for cell transmission by the priority encoder.

3. The device of claim 1, wherein each shaper further includes a third counter initialized to a third starting value, wherein the third counter is decremented continuously on each clock cycle of the associated clock source.

4. The device of claim 3, wherein for each shaper the third starting value is an integral multiple of the first starting value.

5. The device of claim 3, wherein for each shaper, each VC in the link list has a credit count parameter, wherein when the third counter is decremented to a value of zero, the credit count parameter for each associated VC is incremented by an increment value.

6. The device of claim 5, wherein when a shaper is selected for cell transmission only VCs that have a specified credit count parameter value or higher transmit a cell over the one or more networks.

7. The device of claim 1, wherein at least one of the shapers has at least one CBR VC and at least one VBR VC in the associated link list.

8. The device of claim 1, wherein the associated link list for each of the shapers includes at least one CBR VC and at least one VBR VC.

* * * * *